United States Patent
Loss et al.

(10) Patent No.: US 10,718,449 B2
(45) Date of Patent: Jul. 21, 2020

(54) MULTI-FUNCTION SYSTEM SUPPORT TRAY

(71) Applicant: SPIRIT AEROSYSTEMS, INC., Wichita, KS (US)

(72) Inventors: Kevin Leroy Loss, Bel Aire, KS (US); Allen Douglas Gerdes, Benton, KS (US); John Matthew Brannon, Kechi, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 4 days.

(21) Appl. No.: 16/105,635

(22) Filed: Aug. 20, 2018

(65) Prior Publication Data
US 2020/0056726 A1 Feb. 20, 2020

(51) Int. Cl.
| | |
|---|---|
| *F16L 3/227* | (2006.01) |
| *B64C 1/18* | (2006.01) |
| *F16L 3/23* | (2006.01) |
| *B60R 16/02* | (2006.01) |
| *H02G 3/04* | (2006.01) |

(52) U.S. Cl.
CPC ............... *F16L 3/227* (2013.01); *B64C 1/18* (2013.01); *F16L 3/23* (2013.01); *B60R 16/0215* (2013.01); *H02G 3/0406* (2013.01)

(58) Field of Classification Search
CPC ..... F16L 3/227; F16L 3/23; F16L 3/22; F16L 3/2235; B64C 1/18; B64C 1/406; B60R 16/0215; B60R 16/02; B60R 16/0207; H02G 3/0406; H02G 3/0437; H02G 3/045; H02G 3/0443; H02G 3/30; H02G 3/32; H02G 3/26; H02G 3/263; H01B 17/06
See application file for complete search history.

(56) References Cited

U.S. PATENT DOCUMENTS

| | | | | |
|---|---|---|---|---|
| 1,995,370 | A * | 3/1935 | Walters | F16B 5/0685 248/68.1 |
| 4,395,009 | A * | 7/1983 | Bormke | H02G 3/32 174/157 |
| 4,609,171 | A * | 9/1986 | Matsui | F16L 3/12 24/16 PB |
| 7,608,782 | B2 * | 10/2009 | Hill | H01R 4/48 174/84 C |

(Continued)

*Primary Examiner* — Christopher Garft
(74) *Attorney, Agent, or Firm* — Hovey Williams LLP

(57) ABSTRACT

A multi-function support assembly supports, grounds, and shields numerous different types of aircraft systems and simultaneously stabilizes aircraft structures to which the support assembly is mounted. The support assembly includes a support tray and a number of support brackets attached to and spaced along the length of the support tray. The support tray attaches to aircraft floor beams or other aircraft structures to stabilize the structures while providing a mounting location for the support brackets. The support tray also provides electromagnetic and structural shielding for aircraft systems and a ground path for electrical and electronic components in the aircraft. The support brackets are formed of electrically insulative materials and attach to the support tray to support various aircraft systems below the support tray and to electrically isolate the support tray from the aircraft structures and the aircraft systems from the support tray.

12 Claims, 6 Drawing Sheets

(56) References Cited

U.S. PATENT DOCUMENTS

| | | | | |
|---|---|---|---|---|
| 9,212,764 | B2* | 12/2015 | Marche | F16L 3/1075 |
| 10,144,371 | B1* | 12/2018 | Bennati | B60R 16/0215 |
| 10,439,381 | B1* | 10/2019 | Mohlman | H02G 3/32 |
| 2002/0084388 | A1* | 7/2002 | Geiger | F16L 3/233 |
| | | | | 248/74.3 |
| 2005/0242245 | A1* | 11/2005 | Balderama | F16L 3/23 |
| | | | | 248/65 |
| 2012/0037763 | A1* | 2/2012 | Guthke | H02G 3/263 |
| | | | | 248/65 |
| 2012/0160962 | A1* | 6/2012 | Holvoet | B64C 1/406 |
| | | | | 244/131 |
| 2013/0189050 | A1* | 7/2013 | James | F16B 37/045 |
| | | | | 411/166 |
| 2014/0215803 | A1* | 8/2014 | Eyles | H02G 3/0406 |
| | | | | 29/525.03 |
| 2017/0267191 | A1* | 9/2017 | Chambosse | B60R 16/0215 |
| 2017/0355329 | A1* | 12/2017 | Palmgren | H02G 3/30 |
| 2019/0176722 | A1* | 6/2019 | Saele | B60R 16/0215 |

\* cited by examiner

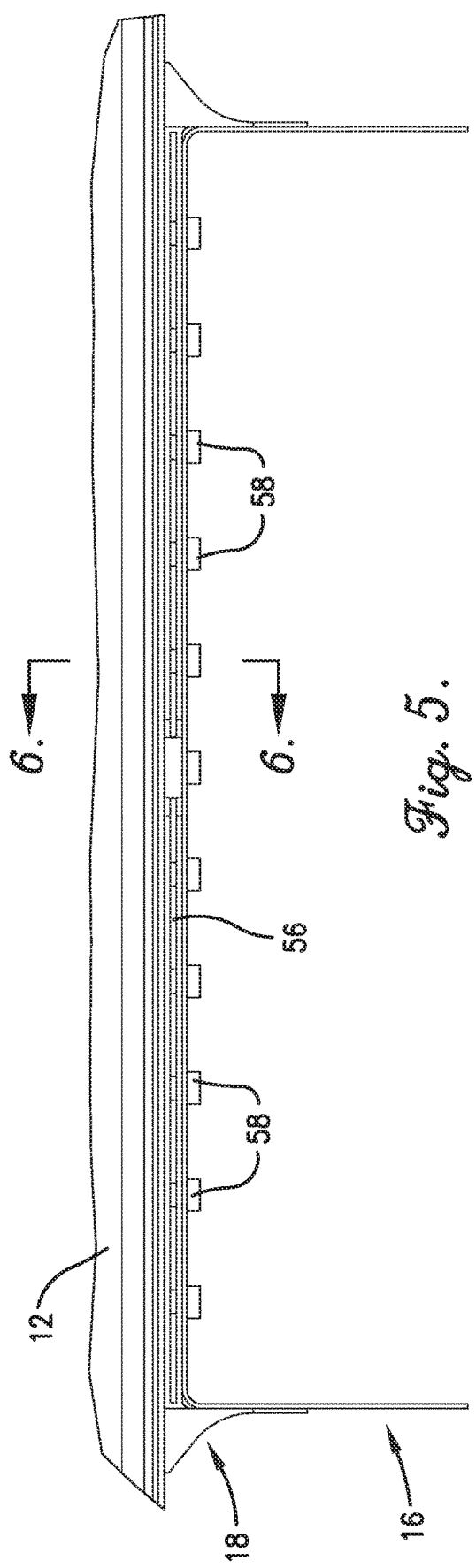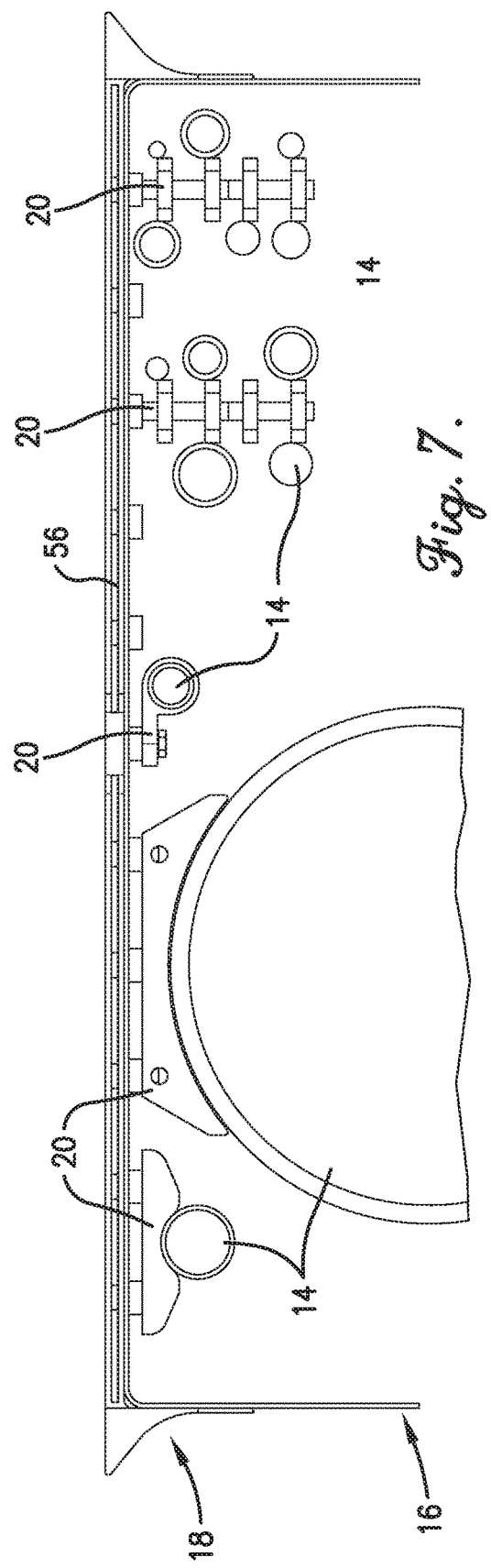

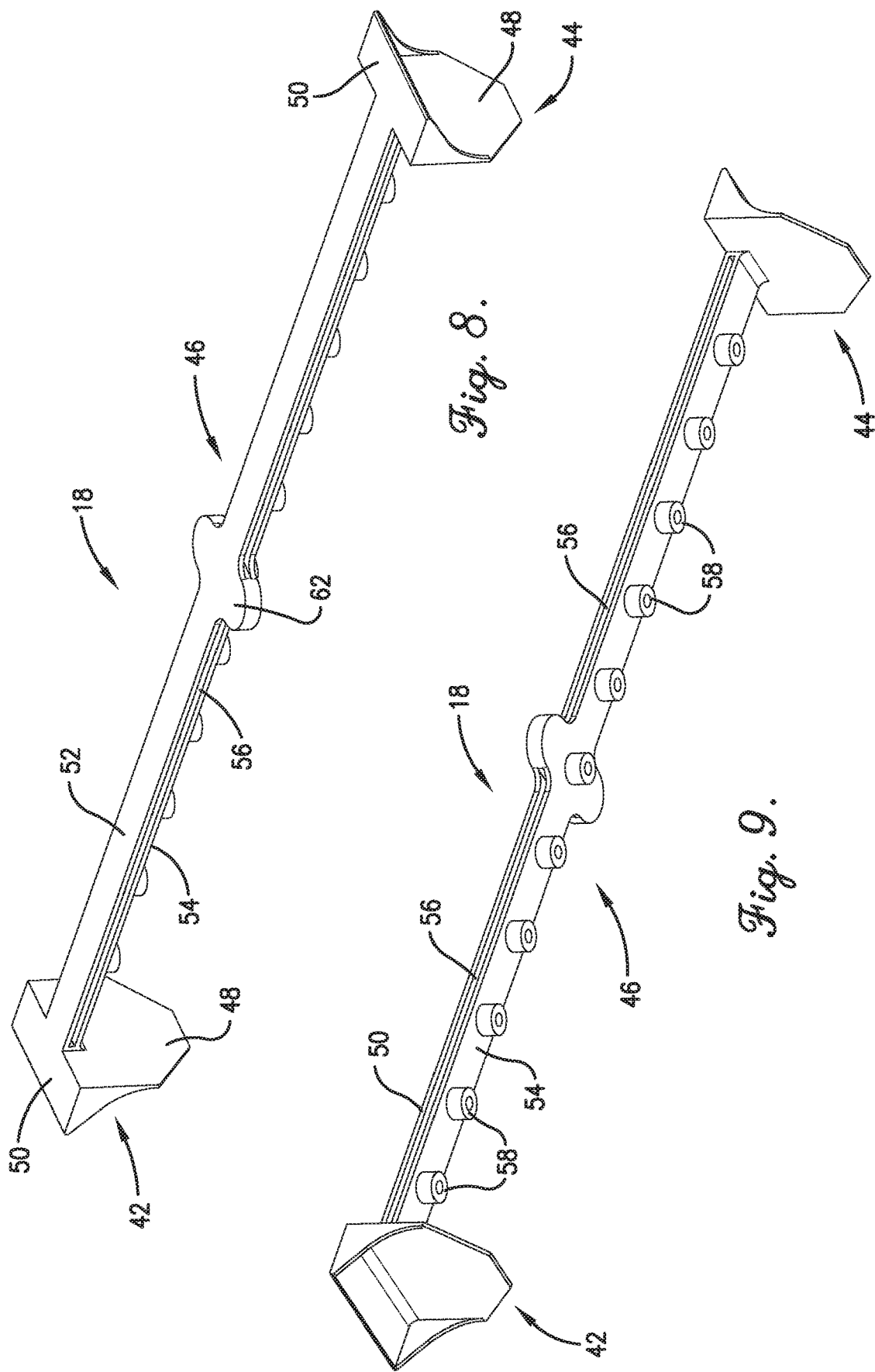

MULTI-FUNCTION SYSTEM SUPPORT TRAY

BACKGROUND

Aircraft include numerous wire bundles, conduits, pipes, ducts, and other aircraft systems that are typically suspended from or otherwise attached to aircraft floor beams or other aircraft structures. Because the aircraft systems are of various shapes and sizes, they often must be supported with a variety of brackets, straps, wire ties or other attachment devices that are each uniquely designed for their respective aircraft systems. Unfortunately, designing, manufacturing, and installing so many disparate attachment devices increases the cost, complexity, and weight of an aircraft.

Aircraft also typically include numerous electrical and electronic devices that must be grounded. This typically requires many unique grounding straps, wires, or cables that further increase the cost, complexity, and weight of the aircraft. Similarly, aircraft wiring and other power and signal propagation devices typically require electromagnetic and structural shielding, necessitating many disparate shields that further increase the cost, complexity, and weight of the aircraft.

Another related issue is the need to stabilize certain aircraft structures such as floor beams to prevent them from "rolling-over" or otherwise shifting or breaking. This too requires many disparate stabilization straps, intercostals, and other devices, further increasing the cost, complexity, and weight of the aircraft.

SUMMARY

The present invention solves the above-described problems and provides a distinct advance in the art of aircraft design and assembly by reducing the number of disparate devices required to support, ground, and shield aircraft systems and stabilize aircraft structures.

An embodiment of the invention is an adaptable multi-function support assembly that simultaneously performs the functions of multiple different attachment devices, grounding devices, shields, and stabilization devices while achieving additional benefits none of the prior art devices provide alone or in combination. An embodiment of the support assembly broadly comprises a support tray and a number of support brackets attached to and spaced along the length of the support tray.

The support tray performs several important functions. First, it provides a mount for the support brackets, which in turn provide mounting locations for various types of hardware to which wire bundles, individual wires, conduits, pipes, ducts, or any other aircraft systems may be attached. Second, it provides electromagnetic and structural shielding for the aircraft systems attached to the support brackets. And third, it provides a ground path for electrical and electronic components in the aircraft.

Likewise, the support brackets perform several important functions. First, they attach the support tray to aircraft floor beams or other aircraft structures to both support the support tray and stabilize the structures. And second, they provide mounts for attaching various types of support hardware to which wire bundles, individual wires, conduits, pipes, ducts, or any other aircraft systems may be attached.

An embodiment of the support tray is formed of electrically conductive materials such as metal and comprises an elongated central portion and a pair of transversely-extending legs depending from the left and right edges of the central portion. Rows of apertures extend through the upper and lower surfaces of the central portion for accommodating the support brackets as described below.

The support brackets are formed of electrically insulative materials such as plastics, and each comprises a pair of attachment lugs connected by a support link. The attachment lugs attach to the transversely-extending legs of the support tray and attach the support tray to the aircraft floor beams or other structures. The support brackets also comprise a number of universal hardware mounts depending from the support link and extending through the apertures in the support tray for coupling with and attaching support hardware below the support tray. Aircraft systems may then be attached to the support hardware so they are supported from and shielded by the support tray.

The above-described support assembly can be used to support, ground, and shield numerous different types of aircraft systems without requiring a plethora of disparate attachment devices, grounding devices, and shields. It also stabilizes the support structures to which the aircraft systems are mounted without requiring a plurality of disparate stabilization devices. The support brackets, which are formed of plastics or similar materials, also provide a corrosion neutral barrier between the metal support tray and the support structures to which it is attached and between the metal support tray and the aircraft systems which are supported by the support tray.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 5 is a front elevational view of the support assembly shown attached to an aircraft floor beam.

FIG. 7 is a front elevational view of the support assembly shown with support hardware and aircraft systems.

FIG. 8 is a top perspective view of one of the support brackets of the support assembly.

FIG. 9 is a bottom perspective view of one of the support brackets of the support assembly.

Figure 1:
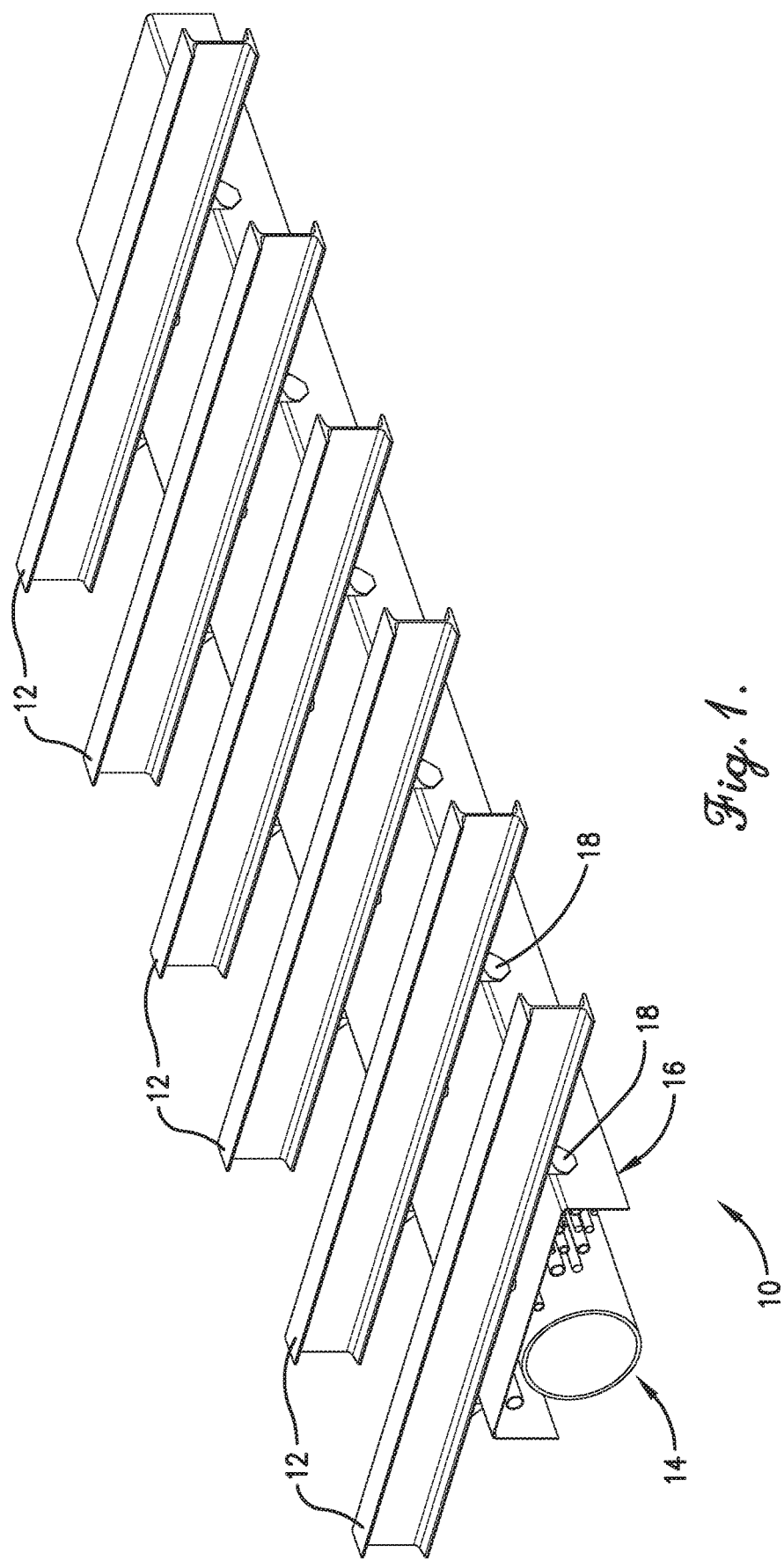
FIG. 1 is a perspective view of a support assembly constructed in accordance with embodiments of the present invention shown installed beneath floor beams of an aircraft and shown supporting various aircraft systems.

The drawing figures do not limit the present invention to the specific embodiments disclosed and described herein.

The drawings are not necessarily to scale, emphasis instead being placed upon clearly illustrating the principles of the invention.

DETAILED DESCRIPTION

A multi-function support assembly constructed in accordance with embodiments of the present invention supports, grounds, and shields wire bundles, individual wires, conduits, pipes, ducts, or any other aircraft systems and simultaneously stabilizes the support structures to which the aircraft systems are mounted. The support assembly can be easily adapted to accommodate nearly any aircraft design and therefore provides an essentially uniform solution for supporting, grounding, shielding, and stabilizing aircraft systems. The support assembly also provides a corrosion neutral barrier between its metal support tray and the support structures to which it is attached and between the metal support tray and the aircraft systems which are supported by the support tray.

Figure 2:
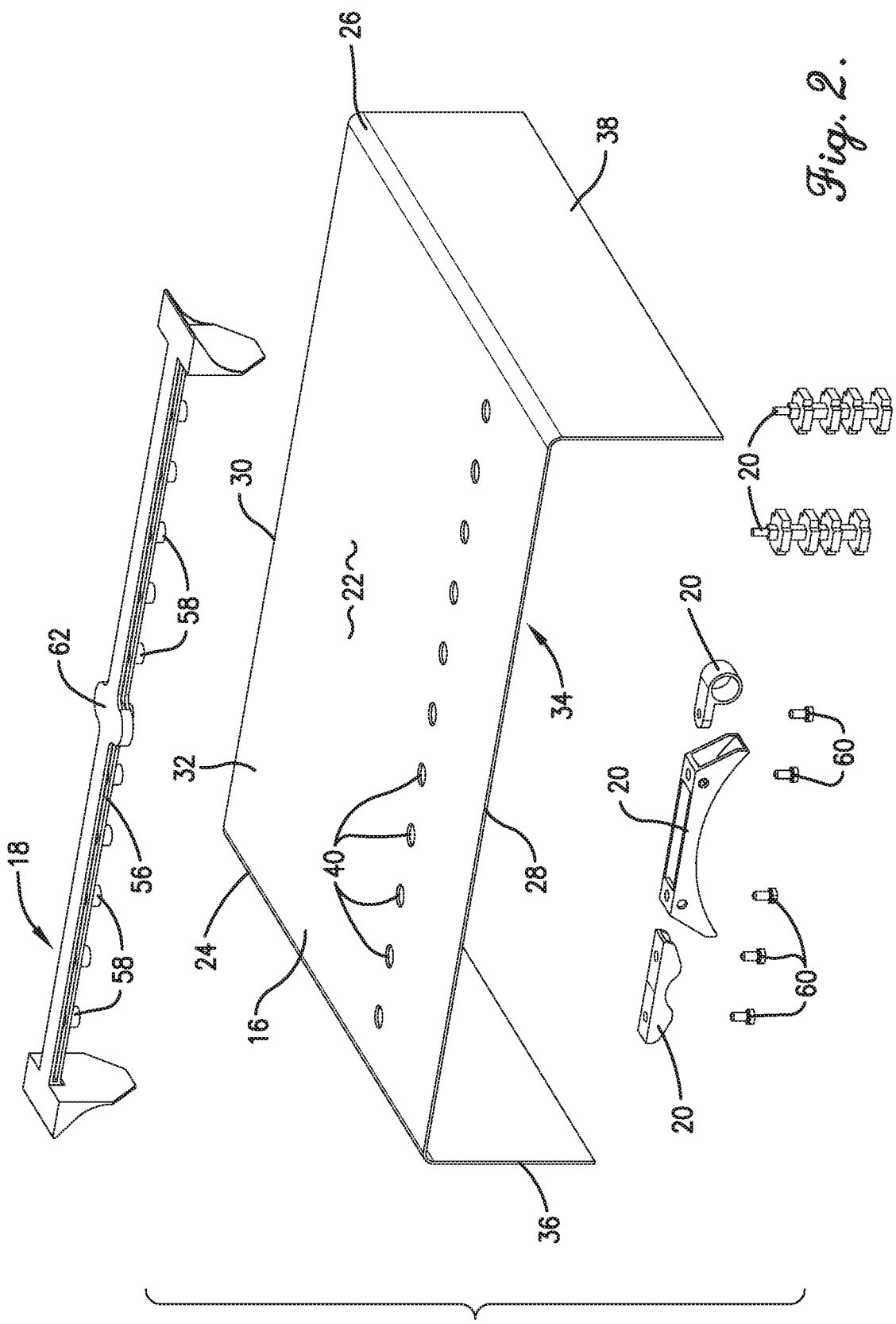
FIG. 2 is an exploded fragmentary perspective view of the support assembly and several types of support hardware to be attached to the support assembly.
Figure 3:
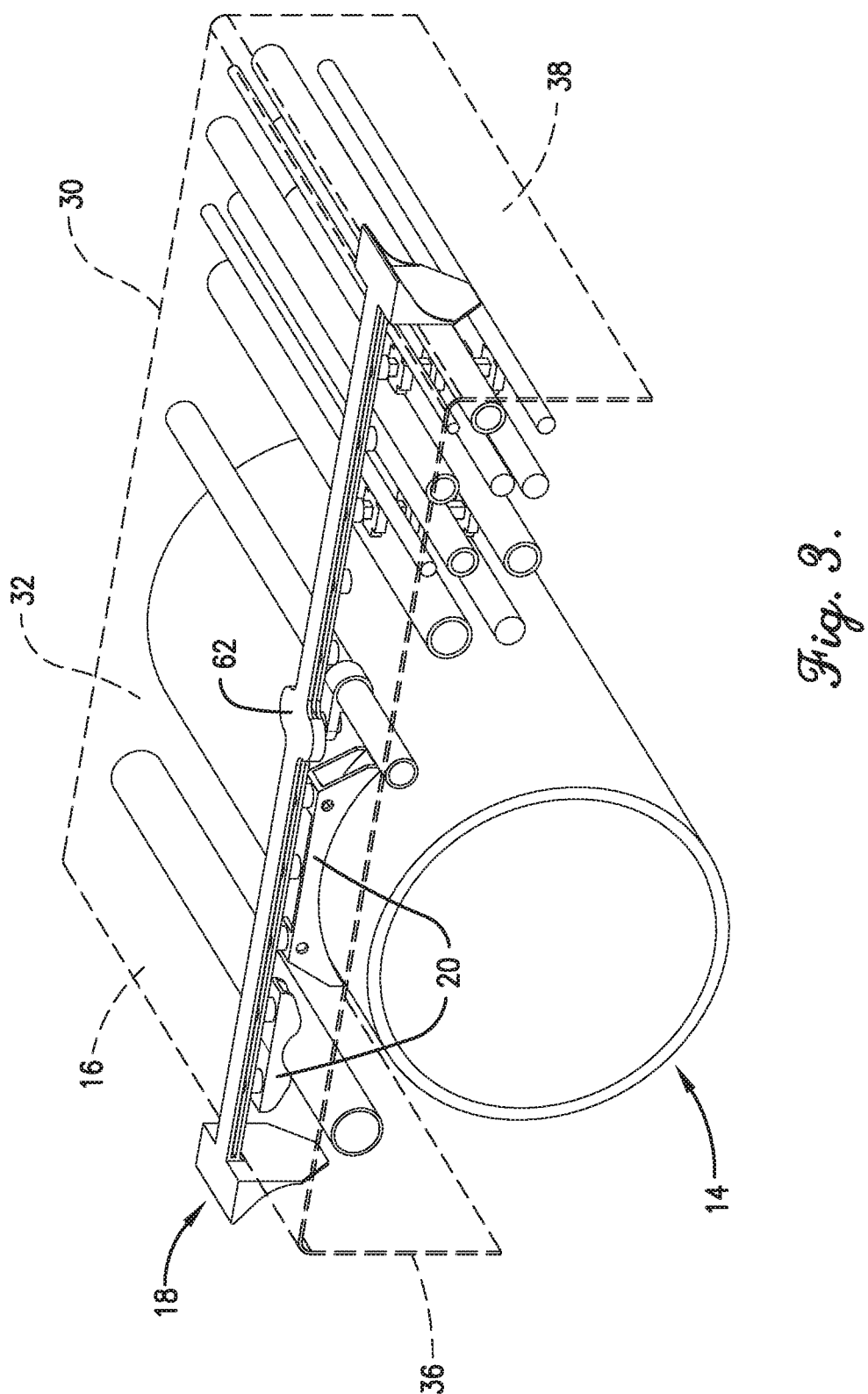
FIG. 3 is a perspective view of the support assembly with its support tray show in phantom lines so as to reveal the support hardware and aircraft systems beneath the support tray.

Specific embodiments of the support assembly will now be described with reference to the attached drawing figures. As best shown in FIG. 1, a support assembly 10 constructed in accordance with embodiments of the invention may be attached to aircraft floor beams 12 or other aircraft structures and may support various different aircraft systems 14 to the aircraft structures. As best shown in FIG. 2, an embodiment of the support assembly 10 broadly comprises a support tray 16 and a number of support brackets 18 attached to and spaced along the length of the support tray.

The support tray 16 provides a mount for the support brackets 18, which in turn provide mounting locations for various types of support hardware 20 to which wire bundles, individual wires, conduits, pipes, ducts, or any other aircraft systems 14 may be attached. The support tray also provides electromagnetic and structural shielding for the aircraft systems and a ground path for electrical and electronic components in the aircraft.

The support tray 16 is formed of electrically conductive materials such as metal and may be any shape and size. For many aircraft applications, the support tray is formed of alloy sheet material and sized for the electrical and structural load requirements of the application.

Figure 4:
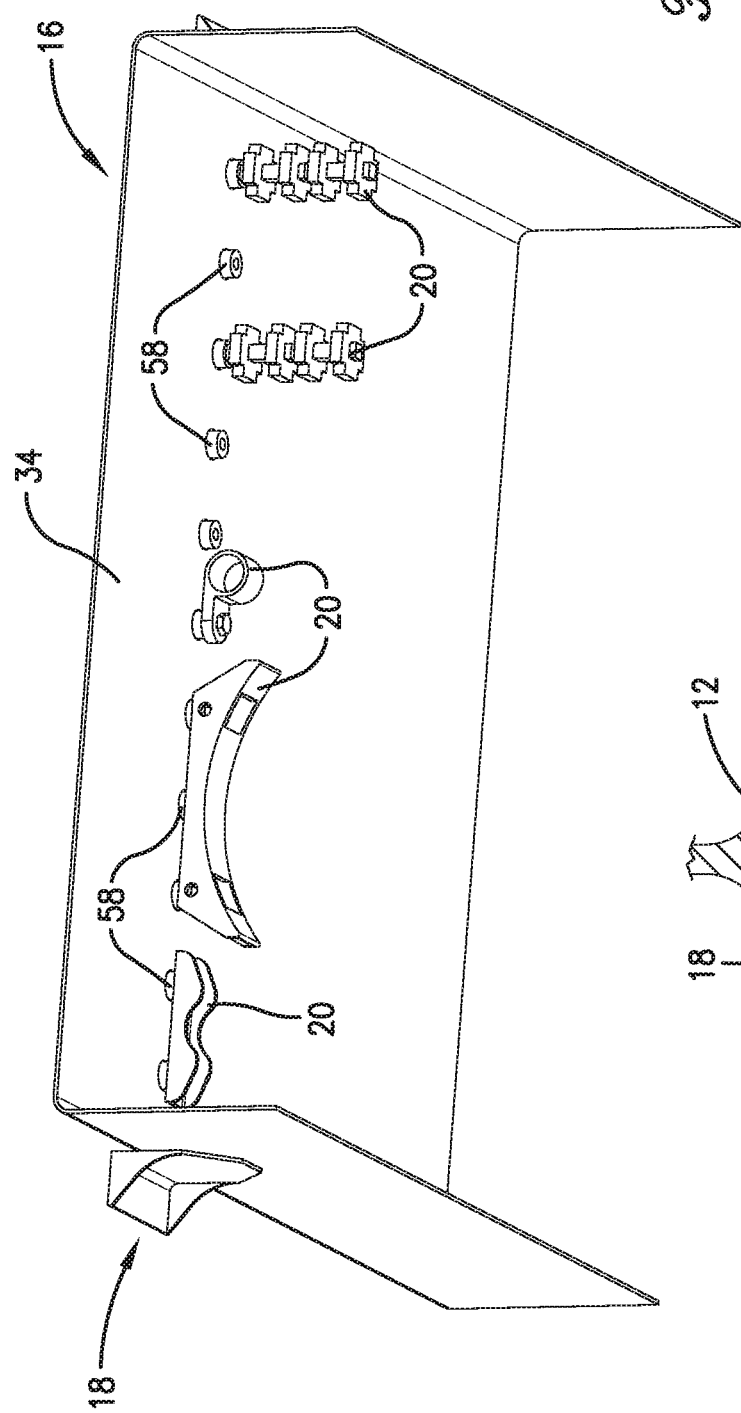
FIG. 4 is a bottom perspective view of the support assembly and support hardware attached thereto.
Figure 6:
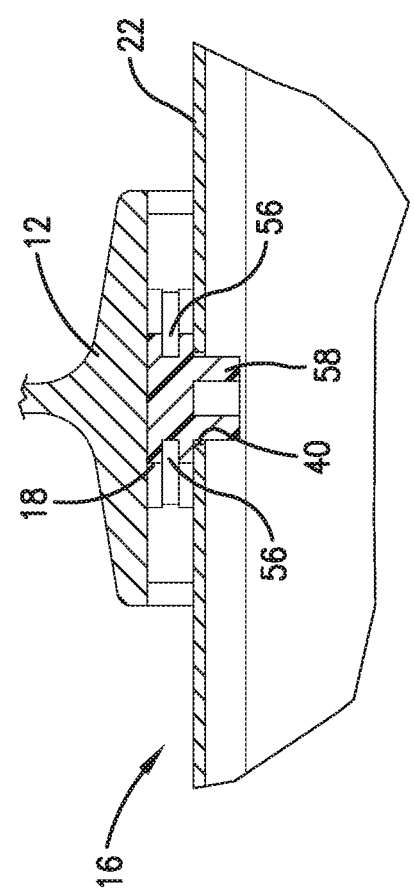
FIG. 6 is a sectional view taken along line 6-6 of FIG. 5.

As best shown in FIGS. 2 and 4, one embodiment of the support tray 16 comprises an elongated central portion 22 having left and right edges 24, 26, front and rear edges 28, 30, and upper and lower surfaces 32, 34. The support tray 16 also comprises a pair of transversely-extending legs 36, 38 depending from the left and right edges 24, 26 of the central portion 22 such that the support tray is in the general shape of an inverted U. In one embodiment, the legs 36, 38 are formed at right angles relative to the central portion 22 and are approximately 2-12" tall.

The support tray 16 further comprises a number of apertures 40 formed through its central portion 22 for accommodating the support brackets 18 as described in more detail below. The apertures 40 may be formed in rows spaced between the front and rear edges 28, 30 of the support tray 16, with each row extending between the left and right edges 24, 26 of the support tray. As discussed in more detail below, each row of apertures provides mounting for one of the support brackets 18.

FIG. 2 only shows a short section of the support assembly 10 with a single row of apertures 40, but any number of rows of apertures with any number of apertures per row may be provided. In one embodiment, the rows are spaced 1-5 feet apart and each row contains 2-20 apertures.

The support brackets 18 attach the support tray 10 to the aircraft floor beams 12 or other aircraft structures while simultaneously stabilizing the structures. The support brackets 18 also provide mounts for the support hardware 20 to which the aircraft systems 14 may be attached.

The support brackets 18 are formed of electrically insulative materials such as plastics or other synthetic resin materials and may be attached to the upper surface of the support tray 16 with rivets, adhesives, or fasteners. As best shown in FIGS. 8 and 9, each support bracket 18 comprises a pair of attachment lugs 42, 44 or other attachment structures connected by a support link 46. The attachment lugs 42, 44 each have a vertically-extending section 48 and a horizontally-extending section 50. The vertically-extending sections 48 overlap and attach to the legs 36, 38 of the support tray 16 to attach the support bracket to the support tray. The horizontally-extending sections 50 attach to the underside of the aircraft structure 12 to connect the support tray to the aircraft structure.

An embodiment of the support link 46 has spaced-apart upper and lower sections 52, 54 separated by a gap 56. Other embodiments of the support link may be one-piece with no gap. The support link 46 also has a number of universal hardware mounts 58 depending from the lower section 54 and extending through the apertures 40 in the support tray 16. The hardware mounts 58 each have an internally-threaded shaft or other attachment structure for receiving a bolt, screw, or other fastener 60 that affixes a piece of support hardware 20 to the mount. The support link 46 may also have an intermediate attachment wing 62 that serves as an additional attachment point for fastening the support bracket underneath a floor beam or other aircraft structure.

The support assembly 10, the support hardware 20, and the aircraft systems 14 supported thereby may be installed as follows. First, the support tray 16 and support brackets 18 are attached to the aircraft floor beams 12 or other aircraft structures. This may be done with screws, adhesives, or other fasteners applied between the attachment lugs 42, 44, and 62 of the support brackets and the floor beams or other structures. The support brackets 18 not only mount the support assembly 10 to the floor beams 12, but also anchor the floor beams to one another so they are less prone to roll-over or otherwise shift or break.

In some embodiments, the support tray 16 is positioned and attached such that its central portion 22 is substantially horizontal or parallel to a floor of the aircraft and its legs 36, 38 are substantially vertical. In other embodiments, the support tray 16 may be mounted so that its central portion 22 extends vertically or at any angle relative to the aircraft floor.

Next, support hardware 20 is fastened to the hardware mounts 58 of the brackets 18 with screws, bolts, or other fasteners 60. The support hardware 20 may include wire hangers, wire support posts, duct support brackets, clamps, or any other hardware to which aircraft systems may be attached so the aircraft systems are supported from and shielded below the support tray. Because the support brackets each have a number of spaced hardware mounts, nearly any type of support hardware in nearly any combination may be attached to the hardware mounts. For example, a single wire hanger may be attached to each and every hardware mount 58 such that all the hardware mounts are used. Alternatively, several of the hardware mounts 58 may be used for larger saddle mounts or even left unused completely to accommodate aircraft system spacing requirements. A designer or installer may configure the support assembly 10 in a myriad of ways to support nearly any combination of aircraft systems.

The above steps may be performed in a different order. For example, the support assembly 10, support hardware 20, and aircraft systems may be pre-assembled together then taken to an aircraft and attached to the floor beams 12 or other aircraft structures.

Finally, aircraft systems 14 such as wire bundles, individual wires, conduits, pipes, ducts are attached to the support hardware 20 so the aircraft systems are supported, shielded, and potentially grounded by the support tray 16. Electrical or mechanical equipment such as control boxes, valves, etc.

The above-described support assembly 10 provides numerous advantages. For example, it supports, grounds, and shield numerous different types of aircraft systems 14 without requiring a plethora of unique and disparate attachment devices, grounding devices, and shields. It also stabilizes the support structures 12 to which the aircraft systems 14 are mounted without requiring a plurality of unique and disparate stabilization devices. The support brackets 18, which are formed of plastics or similar materials, also inhibit corrosion by providing a corrosion neutral barrier between the metal support tray 16 and the support structures 12 to which it is attached and the aircraft systems 14 which are supported by the support tray.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. For example, although the embodiments of the support assembly described in detail herein are especially suited for use in aircrafts, other embodiments can be configured for use in other vehicles such as boats, trucks and cars so as to support, shield, and ground vehicle systems and to stabilize structures in such vehicles.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A multi-function support assembly comprising:
   an elongated electrically conductive support tray, wherein the support tray includes a central horizontally-extending portion and a pair of transversely-extending legs on opposite edges of the central portion; and
   a plurality of electrically insulative support brackets attached to and spaced along a length of the support tray for attaching the support tray to structures in a vehicle and for supporting vehicle systems to the support tray, each support bracket comprising:
   an attachment structure for attaching the support bracket to the support tray and attaching the support tray to at least one of the structures in the vehicle; and
   a plurality of hardware mounts extending from the support tray and configured for coupling with support hardware to which the vehicle systems may be attached so as to support the vehicle systems with the support tray, electrically isolate the vehicle systems from the support tray, and shield the vehicle systems with the support tray, wherein the hardware mounts extend through and depend from the central portion of the support tray and are spaced between the legs of the support tray such that the vehicle systems attached to the support hardware are protected and shielded by the support tray.

2. The multi-function support assembly of claim 1, wherein the vehicle is an aircraft and the structures in the vehicle are aircraft floor beams.

3. The multi-function support assembly of claim 1, wherein the vehicle systems are selected from the group consisting of: wire bundles, individual wires, conduits, pipes, and ducts.

4. The multi-function support assembly of claim 1, wherein the support hardware is selected from the group consisting of: wire hangars, wire support posts, duct support brackets, and clamps.

5. The multi-function support assembly of claim 1, wherein the support tray has a length of 1-60 feet and a width of 12-20 inches.

6. The multi-function support assembly of claim 1, wherein each support bracket includes 5-20 hardware mounts spaced 1-4 inches apart.

7. The multi-function support assembly of claim 1, wherein the support brackets are formed of synthetic resin materials.

8. The multi-function support assembly of claim 1, wherein the support tray is formed of metal and sized and configured to provide electromagnetic shielding and structural shielding for the vehicle systems and for structurally stabilizing the structures in the vehicle to which the support tray is attached.

9. A multi-function support assembly for supporting aircraft systems on aircraft structures, the multi-function support assembly comprising:
- an inverted U-shaped support tray formed of electrically conductive materials and comprising:
  - an elongated central portion having upper and lower surfaces, left and right edges, front and rear edges, and rows of apertures extending through the upper and lower surfaces; and
  - a pair of transversely-extending legs depending from the left and right edges of the central portion; and
- a plurality of support brackets formed of electrically insulative materials and attached to and spaced along a length of the support tray, each support bracket comprising:
  - a pair of attachment lugs that each attach to one of the transversely-extending legs of the support tray and that attach the support bracket and support tray to one of the structures in the aircraft;
  - a support link connecting the attachment lugs and attached to the upper surface of the central portion of the support tray; and
  - a plurality of hardware mounts depending from the support link and extending through the apertures in the support tray for coupling with support hardware to which the aircraft systems may be attached so the aircraft systems are supported from and shielded by the support tray.

10. The multi-function support assembly of claim 9, wherein the aircraft structures are aircraft floor beams.

11. The multi-function support assembly of claim 9, wherein the aircraft systems comprise wire bundles, individual wires, conduits, pipes, and ducts.

12. The multi-function support assembly of claim 9, wherein the support hardware comprises wire hangers, wire support posts, duct support brackets, and clamps.

\* \* \* \* \*